G. SEIDEL.
MACHINE FOR MAKING STEREOTYPE PLATES.
APPLICATION FILED APR. 21, 1914.

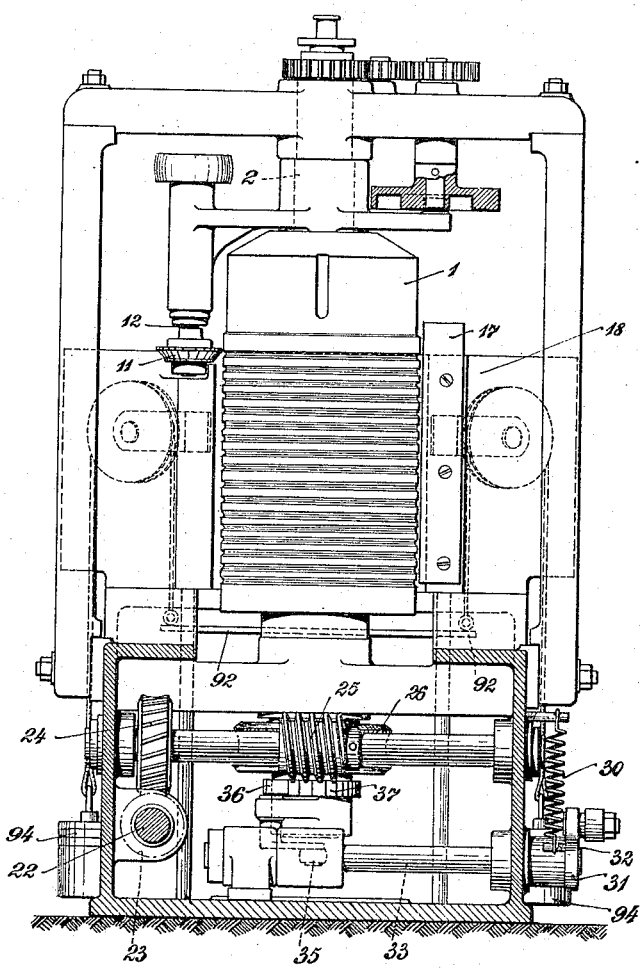

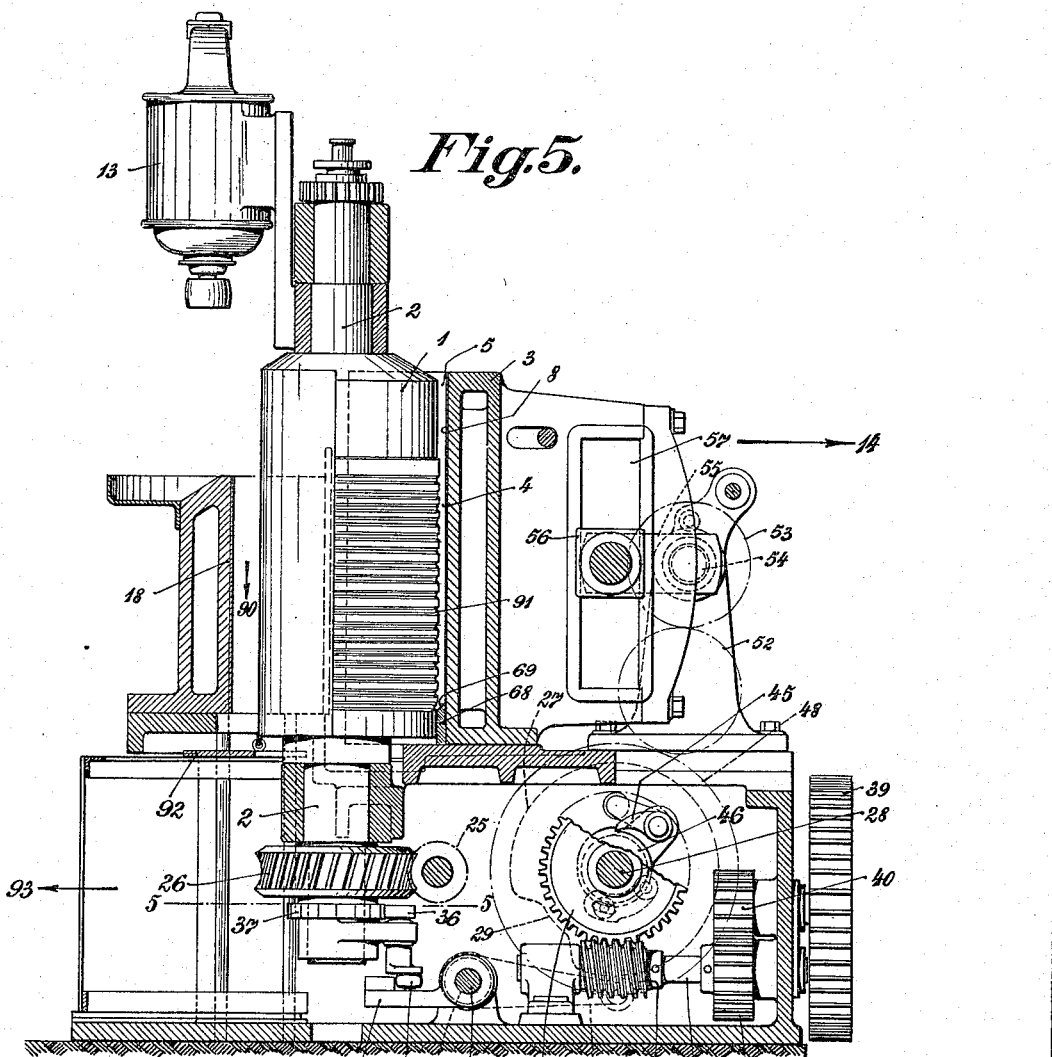

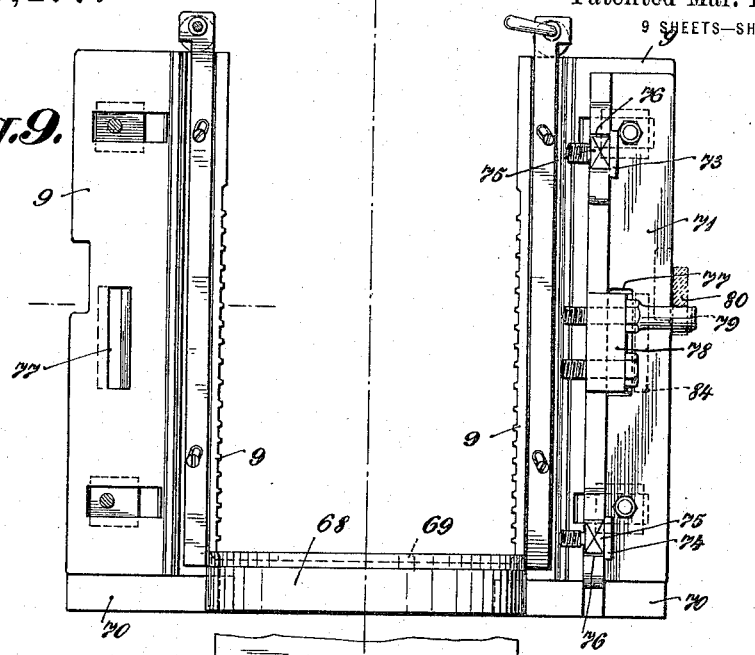
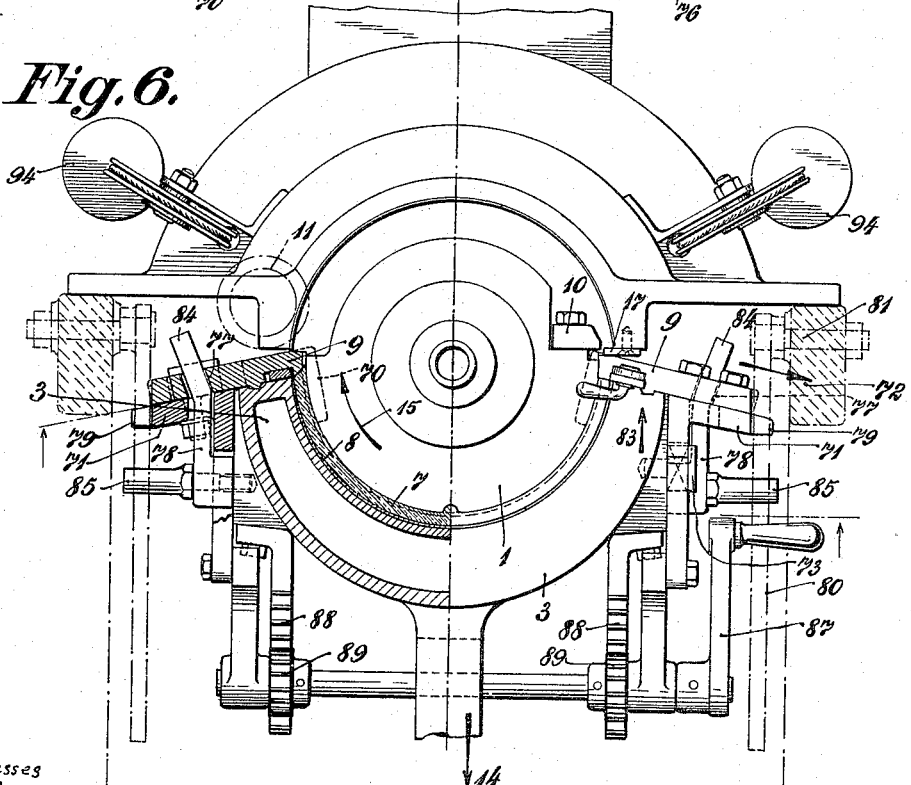

1,175,477.

Patented Mar. 14, 1916.
9 SHEETS—SHEET 7.

Witnesses

Inventor
Georg Seidel

G. SEIDEL.
MACHINE FOR MAKING STEREOTYPE PLATES.
APPLICATION FILED APR. 21, 1914.
1,175,477.
Patented Mar. 14, 1916.
9 SHEETS—SHEET 8.
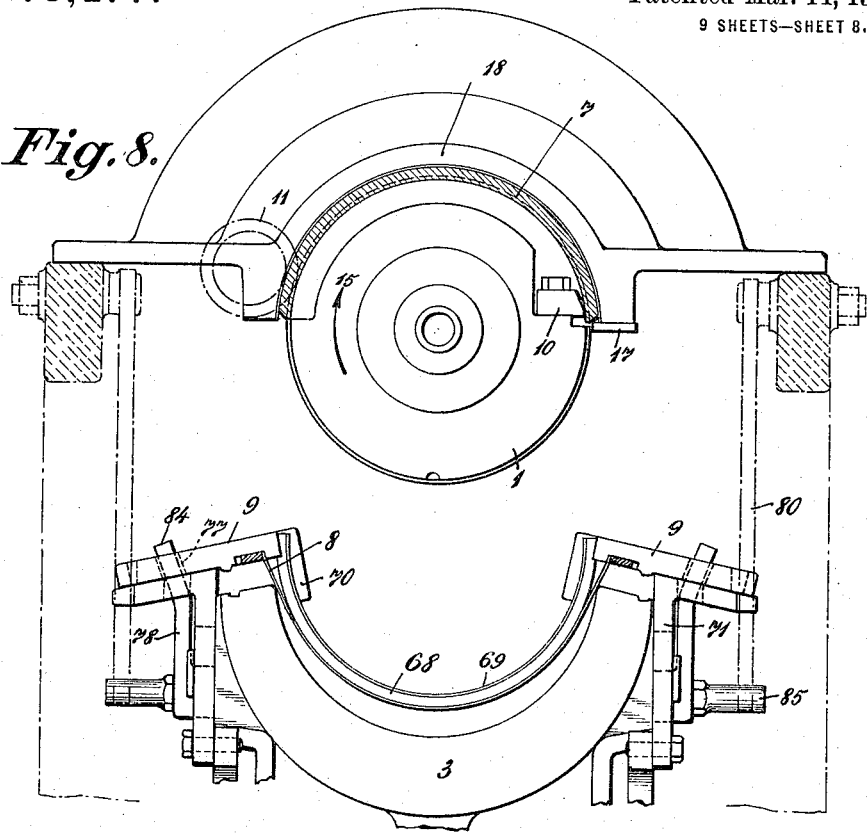
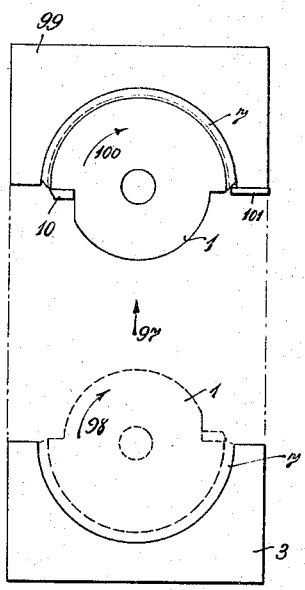
Witnesses
Georg Seidel.

G. SEIDEL.
MACHINE FOR MAKING STEREOTYPE PLATES.
APPLICATION FILED APR. 21, 1914.

1,175,477.

Patented Mar. 14, 1916.
9 SHEETS—SHEET 9.

Inventor.
Georg Seidel
By Knight Bros
Attorneys.

UNITED STATES PATENT OFFICE.

GEORG SEIDEL, OF MUNICH, GERMANY.

MACHINE FOR MAKING STEREOTYPE-PLATES.

1,175,477. Specification of Letters Patent. Patented Mar. 14, 1916.

Application filed April 21, 1914. Serial No. 833,440.

*To all whom it may concern:*

Be it known that I, GEORG SEIDEL, a citizen of the German Empire, and residing at Munich, Germany, have invented certain new and useful Improvements in Machines for Making Stereotype-Plates, of which the following is a specification.

The machines heretofore employed for automatically making finished stereotype plates, *i. e.* plates which are ready for printing, comprise two different elements, viz:—a casting machine having two parts movable relatively to one another, *i. e.* a core and a case or box; and a machine-tool by which the cast plate is tooled, the inside of the plate being bored out and the dead-head milled off. Both the molding machine and the machine tool are incorporated in a single unit and so connected one with the other by conveyer devices that the plate after being cast is automatically conveyed out of the molding machine to the machine-tool.

A primary object of my invention is to provide an improved machine for automatically making finished stereotype plates in which the said two elements, *i. e.* the casting machine and the machine-tool, are incorporated in one single machine, but so, however, that conveyer devices are entirely dispensed with. In my improved machine a single cylinder or core is used in performing all the working operations. On this one cylinder not only is the plate cast and the dead-head milled off, but the inside of the plate is also machined. The machine therefore not only is considerably simpler and cheaper but also occupies considerably less space than those known heretofore, the latter factor being a very important one in printing machinery.

A further object of my invention is to provide improved devices for removing the matrix from the core.

To these ends, the invention consists in the construction, arrangement and combination of parts described hereinafter and pointed out in the claims.

One illustrative embodiment of my invention and a modification thereof are represented by way of example in the accompanying drawings, wherein:—

Figure 1:
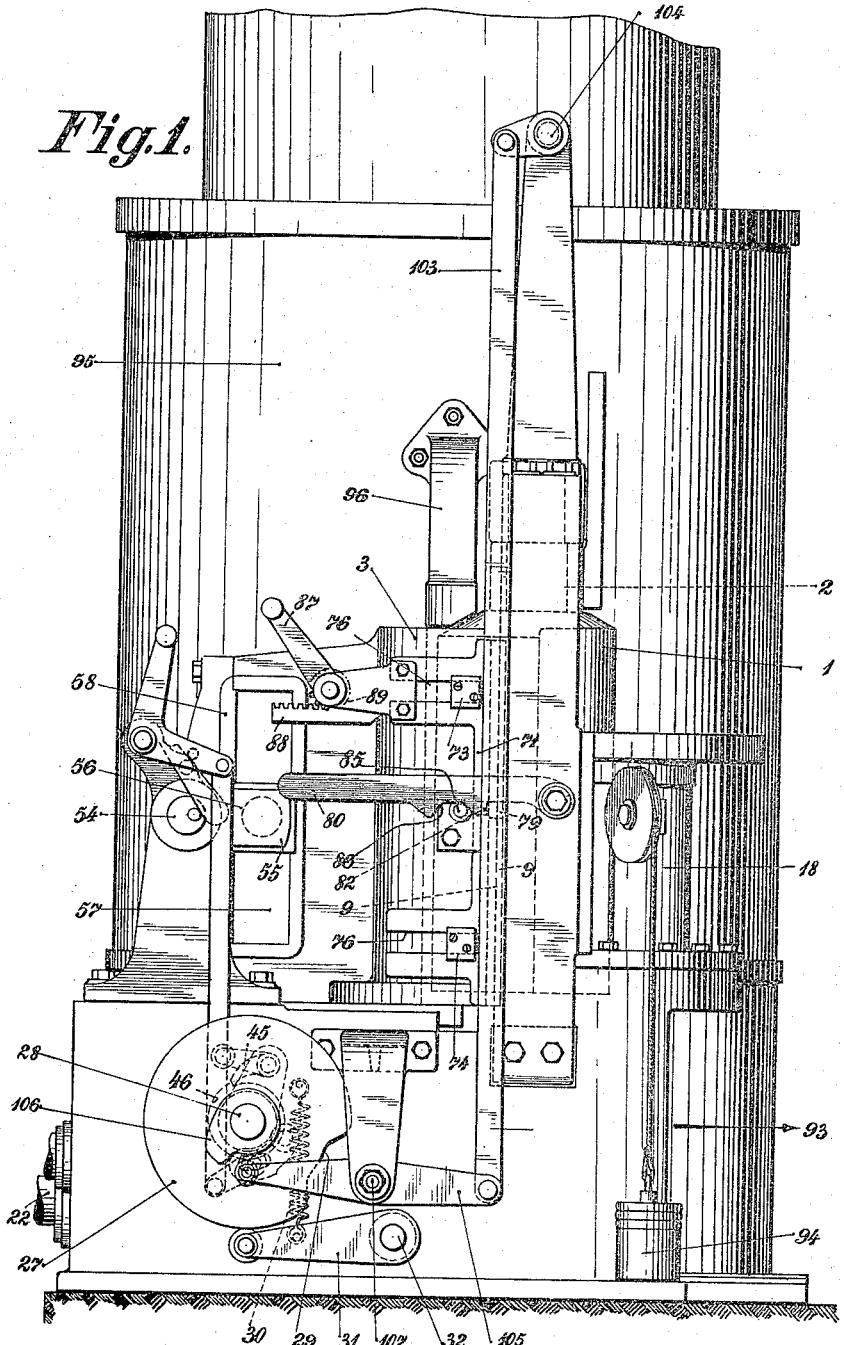
Figure 2:
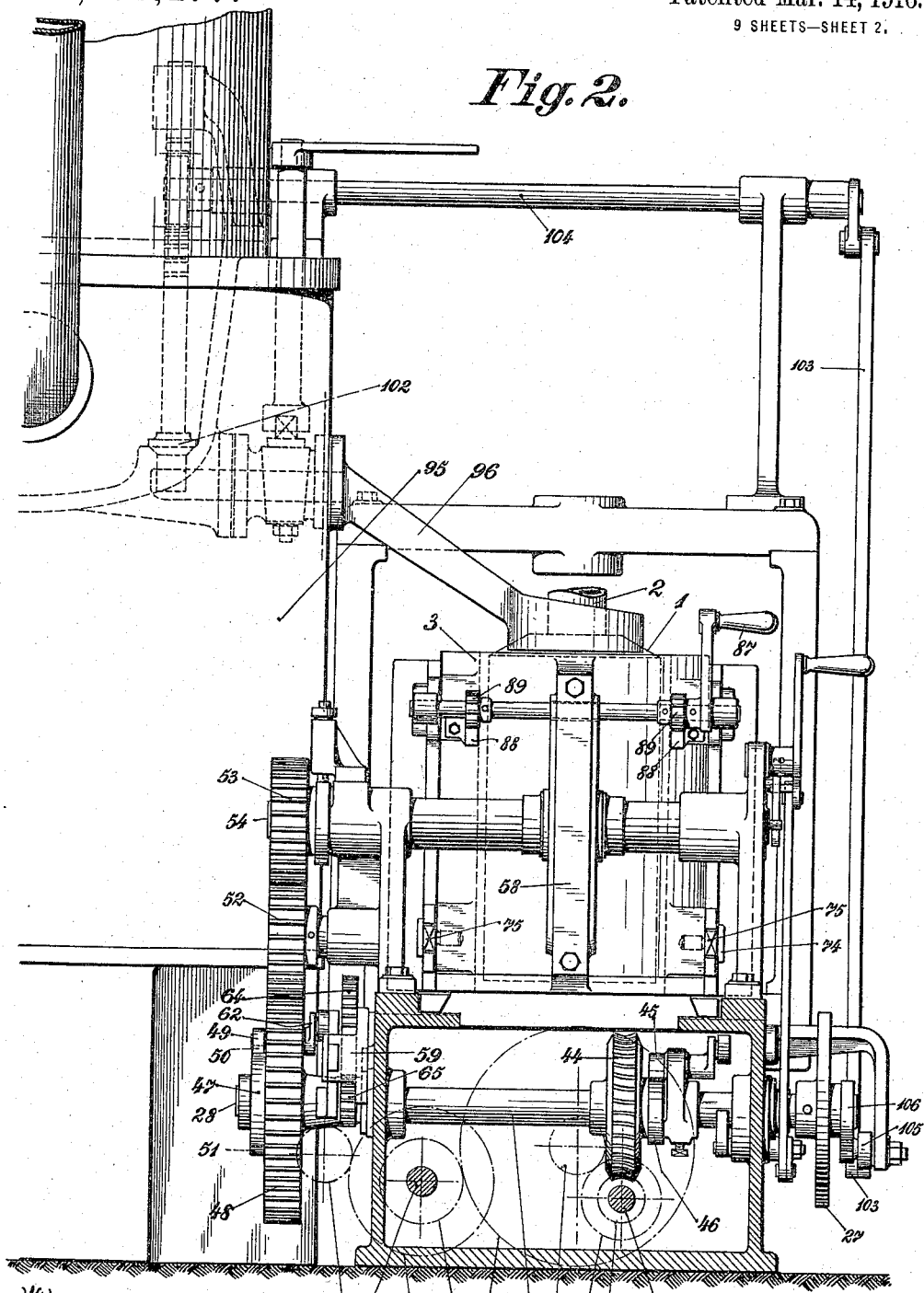
Figure 3:
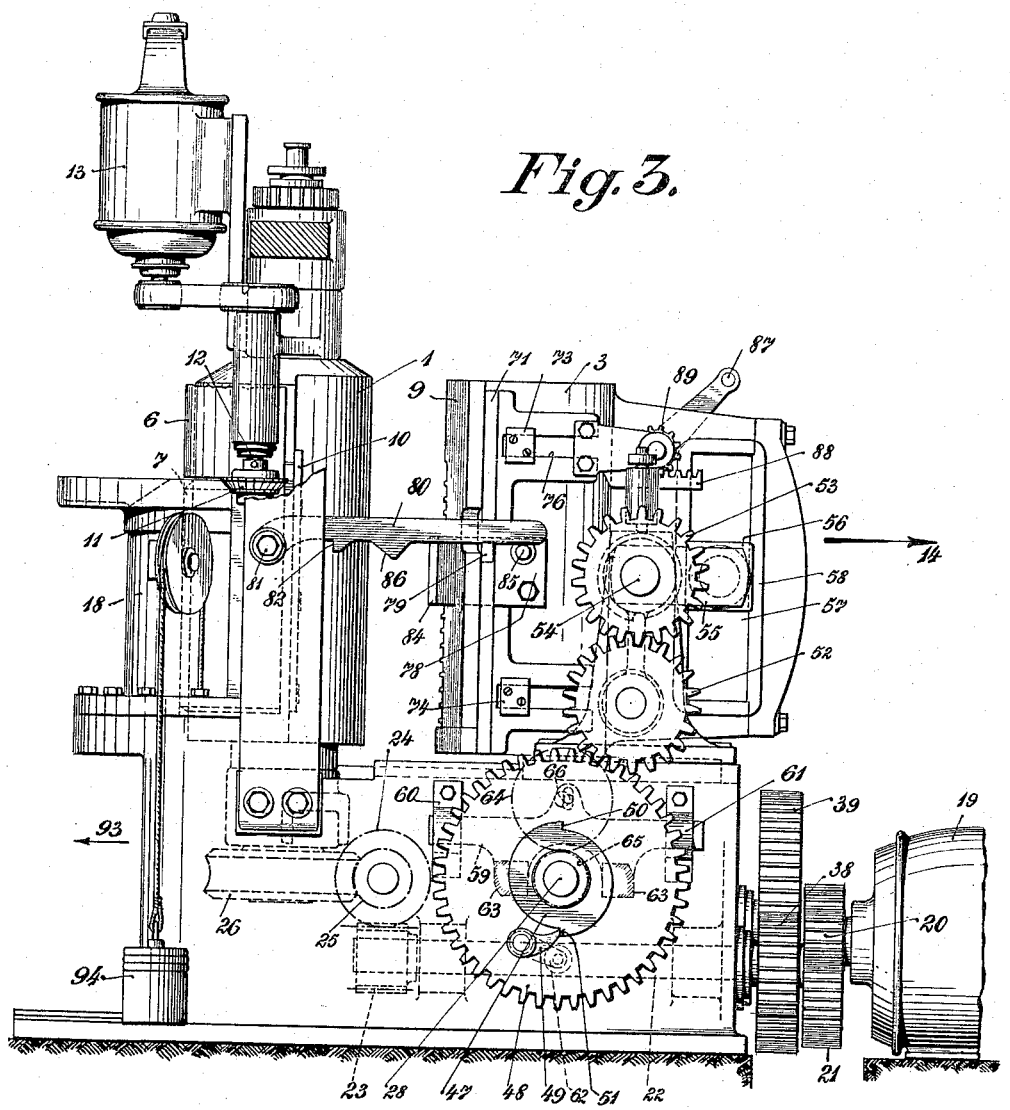
Figure 7:
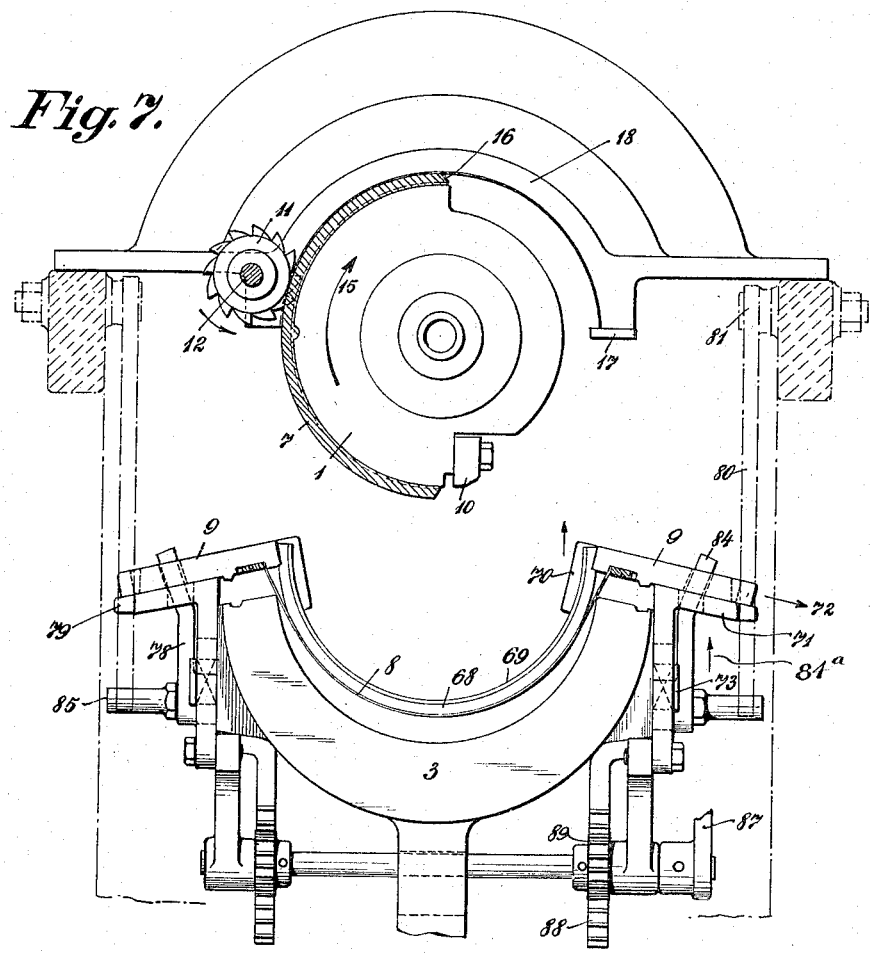
Figure 11:
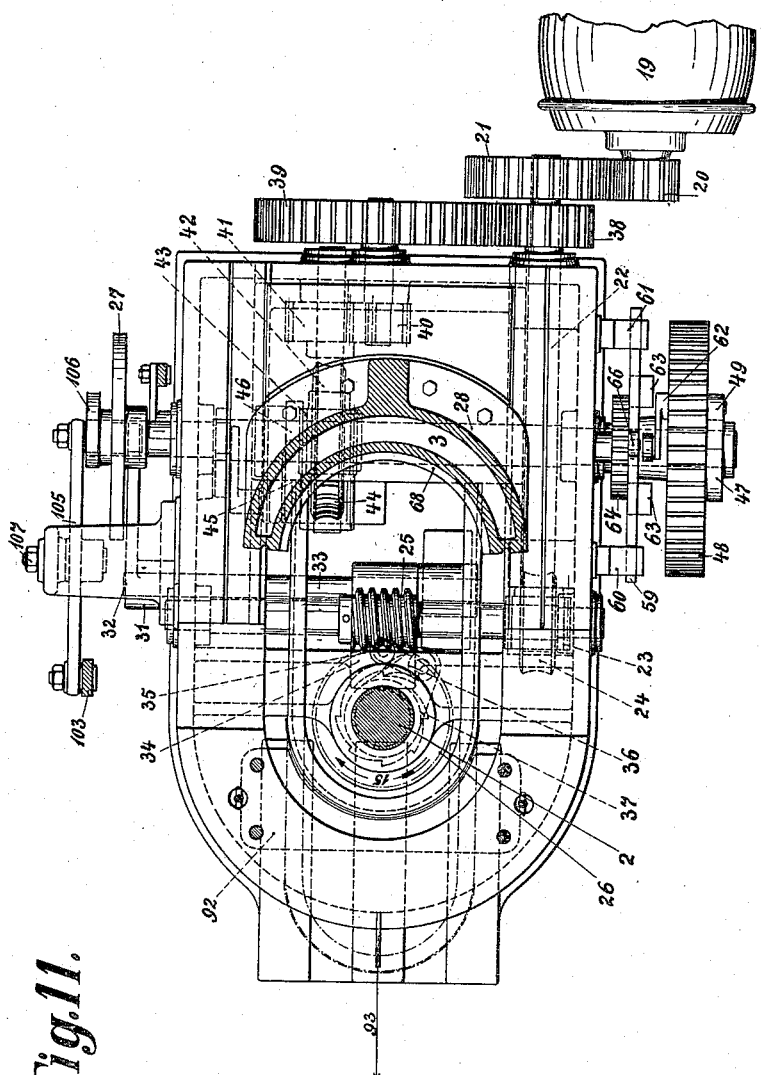

Figure 1 is a side elevation of a preferred form of my improved machine, and Fig. 2 is a front elevation thereof, partly in section; these figures show how the machine may be connected to the copper for molten metal. Fig. 3 shows the machine in elevation as seen from the side on which the furnace is located. Figs. 4 and 5 show the machine in vertical section; Fig. 5ᵃ is a section on line 5—5 of Fig. 5 illustrating a detail. Figs. 6, 7 and 8 show the most important parts of the machine in top plan view, partly in horizontal section, in the different stages of the working operations; Fig. 6 showing the mold closed ready for receiving molten metal, Fig. 7 showing the same during the removal of the dead-head and Fig. 8 during the boring out of the plate; in the positions shown in Figs. 7 and 8 the mold is open, the case or box of the mold being removed from the core. Fig. 9 shows the matrix holders as seen from the side of the case, Fig. 10 diagrammatically shown a modified form of the machine and Fig. 11 shows a plan view partly in section of the various actuating mechanisms.

Referring to the drawings, 1 denotes the cylinder or core which serves as a support during the various operations. This cylinder is rotatable about the shaft 2 and, in combination with the semi-cylindrical back 3, forms the mold. The molten metal supplied through the pipe 96 from the copper 95 (Figs. 1 and 2) is run into the gap 4 between the core 1 and the back 3 (Fig. 5); this gap is of larger cross-section above than below and the enlarged space 5 contains the dead-head 6 of the plate 7. The back 3 can be shifted horizontally relatively to the core 1, and the mold is closed and opened in this manner. The matrix 8 is placed against the inner wall of back 3 in known manner, it being inserted into the case while the mold is open and held at its two side edges by the two holding bars 9 (Figs. 7, 8 and 9). On the core or cylinder 1 is mounted a boring tool 10 which is used for boring out the inside of the plate (Fig. 8). For removing the dead-head 6 from the plate a milling tool 11 is employed, which is mounted on a shaft 12 at the side of the core (Figs. 3 and 7). In the illustrative embodiment the milling tool is driven by a separate electric motor 13.

The movements of the core 1 and the back 3 will first be described. After the plate has been cast in the position shown in Figs. 5 and 6 and has sufficiently cooled, the mold is opened. For this purpose the back 3 is withdrawn from the cylinder horizontally in the direction of the arrow 14, and then occupies the position shown in Figs. 3 and 8. While the back is being withdrawn from the core, the latter rotates in the direction of the arrow 15. The cast plate remains on the circumference of the core and is consequently guided past the milling tool 11. This cutter is started as soon as the plate begins to pass it, and separates the dead-head 6 from the plate 7 (Figs. 3 and 7). The back 3 is retained in the position to which it has been withdrawn, but the core 1 continues to rotate. When, after leaving the position shown in Fig. 7, the core has rotated another 90°, the plate abuts at its edge 16 against a stop 17 which is fast on the semicylindrical member 18 serving as support for boring. Owing to the stop 17, the plate is therefore retained in its position while the core continues to rotate in the direction of the arrow 15, the said plate and core being thus separated from each other. The milling tool 11 has by this time ceased to work, but the boring tool 10 now begins to operate and bores out the inside of the plate 7. Fig. 8 shows the boring tool at the moment when it is about to finish its work. As mentioned above, the plate is held in position by the stop 17 and the member 18. When the core has rotated about 90° from the position shown in these figures, it again arrives into its initial position; the case 3 at the same time approaches the core, the mold being thus closed again and ready for casting, as shown in Fig. 6.

The driving mechanism is shown in Figs. 1 to 5. The pinion 20 fast on the shaft of the driving motor 19 meshes with the spur gear 21 and thereby drives the shaft 22 carrying the worm 23. This shaft drives the shaft 2 by means of the worm gear 24 and the worm 25 which meshes with the worm gear 26 loose on the shaft 2 of the core. The movement of the core is controlled by means of a cam 27 on the shaft 28 (Fig. 1). Against the edge of the cam 27 which is provided with a recess 29 is pressed a lever 31 by means of a spring 30, which lever turns around a fixed point 32 and which turns the shaft 33, see Figs. 4 and 5. As a consequence, a stop 34 which is rigily connected with the lever 31 will be moved downward, thus liberating the anti-friction roller 35 directly the roller of the lever 31 is pressed into the cut out portion 29. The roller 35 is rigidly connected with the ratchet pawl 36. The two elements are revolubly mounted around the point 36ᵃ in the lever 35ᵃ as shown in Fig. 5ᵃ. The lever 35ᵃ is rigidly secured on the shaft 2 while the ratchet wheel 37, compare Fig. 11, is rigidly connected with the worm gear 26. The two wheels are loosely mounted on the shaft 2 and are continuously driven by the worm 25. The shape of the stop 34 is shown in plan view in Fig. 5ᵃ. When now the roller of the lever 31 enters the cut out portion 29 the roller 35 is liberated from the stop 34. The roller 35 and the ratchet pawl 36 thereupon turn around the fulcrum 36ᵃ actuated by a spring and the ratchet pawl 36 snaps into the ratchet wheel 37. In this manner the lever 35ᵃ will be coupled with the ratchet wheel 37; and the lever together with the shaft 2 will as a consequence, be moved by the ratchet wheel 37. The casting core will therefore execute a turning. Before it has completed one revolution, however, the lever 31 again leaves the cut out portion 29 and the stop 34 moves outwardly. Shortly before the completion of one revolution the roller 35 hits against the stop 34. It will therefore again arrive in the position indicated in Fig. 5ᵃ and the ratchet pawl 36 will be lifted from the ratchet wheel 37. The coupling between the worm 26 and the shaft 2 is consequently broken and the casting core will again stand still.

The movement of the back 3 in a horizontal direction is likewise derived from the shaft 22. The spur gear 38 fast on this shaft drives the shaft 42 through the medium of the gear wheels 39, 40 and 41. The worm 43 fast on this shaft 42 meshes with the worm gear 44 which is loose on the shaft 28 and drives this shaft through the medium of the pawl 45 and the ratchet-wheel 46. The movement of the back can be stopped by lifting the pawl 45. The movement of the back is controlled by a cam-wheel 47 on the shaft 28. This cam 47 drives the gear wheel 48 loose on the shaft 28 when the pawl 49 mounted on the wheel 48 engages with the teeth 50 or 51 of the cam-wheel 47. The spur gear 48 drives the spur gear 53, which is on the shaft 54 fixedly journaled in the frame of the machine, through the medium of an intermediate gear 52. The reciprocation of the back 3 takes place with the assistance of the cam sleeve as shown in Figs. 3 and 5. By turning the shaft 54 the crank arm 55 is revolved out of the position shown in Fig. 5 into the position shown in Fig. 3 and the block 56 will then be moved back and forth in the guide 57 of the slide 58. The back 3 which forms one part with the slide 58 will then be moved out of the position indicated in Fig. 5 into the position shown in Fig. 3. By a continued turning of the shaft 54 and the crank arm 55 the back 3 will be returned into the position shown in Fig. 3 and the form will again be closed. The stoppage of the back after the mold is closed is effected by means of a link 59 slidable horizontally to and fro in the bearings 60 and 61. In the position shown in Fig. 3 the pawl 49 and the gear wheel 48 have been turned a quarter revolution. The lever 62, which is firmly connected with the pawl 49, then slides on the stop 63 of the link 61; the pawl 49 is hereby disengaged from the cam-wheel 47. The tooth 50 then slides under the pawl 49. A reciprocatory motion is imparted to the link 58 by means of the two gear wheels 64 and 65 and an eccentric gear 66. In consequence of this movement the pawl 49 is released by the stop 63 of the slide 58. The pawl 49 which is pressed by a spring, not shown, against the periphery of the cam-wheel 47 is driven again by the tooth 51 at the end of half a revolution after the plate has become solid; the gear wheel 48 is hereby driven and the mold is opened again.

My improved means for removing the matrix will now be described. The matrix 8 is inserted while the mold is still open. The side edeges of the matrix are held by the two holding bars 9. When the mold is closed the lower edge of the matrix rests on a frame 68 whose upper part is tapered, for the purpose of casting the facets, and is rigidly connected with the rails 70, on which the bars 9 slide. As is well known, the matrix has generally been removed from the plate after casting and when the mold is opened by first raising the edges of the matrix. In the improved machine I arrange that when the matrix begins to be detached, its edges are moved approximately radially relatively to the core outward. This radial movement is imparted to the matrix by a special movement given to its holding bars 9 (Figs. 6, 7 and 8). These holding bars slide on the rails or bars 70 which are integral with the semicylindrical frame 18. These holding bars are also slidable on the angle bars 71 in the direction of the arrow 72. The angle brackets are held by means of plates 73 and 74 which are attached by square-headed screws 75 to the side wall of the back 3, the screws 75 passing through slots 76 in these bars 71, which are thus displaceable; see Figs. 1, 2 and 3. The plates 74 are secured to the screws 75 by means of rivets as indicated in Figs. 1 and 2. It is thus provided that the angle bars 71 can shift relatively to the back 3 a distance depending on the length of the slots 76.

The holding bars 9 have slots 77 in which the guides 78 slide. The latter are rigidly connected to the back 3. The lever 80, which is fulcrumed at 81 and pulled downwardly by a spring or by gravity, projects over the stop 79 of the bracket 81. The lever 80 locks the bracket by means of the lug 82 as long as this lever is in the position shown in Fig. 1. Consequently, when the back 3 moves in the direction of the arrow 83 the bars 9 and 71 are prevented by this lever from moving with the case.

The mechanism just described above operates as follows:—When the mold is opened, the back 3 first of all moves in the direction of the arrow 83 and takes with it the arm or guide 78 which is fast on the case and slides in the slots 77 in the bars 9 and 71. Since these bars are locked by the face 82 of the lever 80 against motion in the direction of the arrow 83, the outwardly directed portion 84 of the arm 78 forces the holding bar 9 outward in an approximately radial direction. This bar holding the side of the matrix 8 drives the latter so that the matrix holder is lifted away approximately radially. Fast on the case is a pin 85. On the case moving still farther back, this pin 85 bears against the slanting face 86 of the lever 80 and therefore raises this lever to such an extent that the bars 9 and 71, which had been locked by the lug 82 on the lever 80, are now released. Both the bars 9 and 71 can now therefore move in the direction of the arrow 83, and they are taken by the arm 78 in the direction in which the back is moving. The lever 80 is rigidly connected with the core or the machine housing so that when the back moves outwardly in the direction of arrow 14, see Fig. 3 during the opening of the form it presses against the beveled surface 86 and the lever 80 will then be raised and the coupling with the matrix ledges through lug 82 is released so that the bars 9 and 71 may be raised in the direction of the arrow 84ᵃ. The matrix is therefore now detached from the plate. The matrix holders can be opened by hand by means of the lever 87, the toothed rack 88 and the pinion 89. This will be done particularly when a new matrix is to be inserted.

When the core has been moved back into its initial position and the plate is no longer held by the ribs 91 of the core the tooled stereotype plate lies on the plate 92; it descends under the action of gravity. It can then be removed from the machine in the direction of the arrow 93 by a workman. The plate is prevented from falling too fast and impacting too violently by the counterweight 94.

In the improved machine the matrix holders are so formed that they simultaneously constitute the closure device for the mold. No special closure devices are therefore requisite.

Referring now to Fig. 10, the core is here again denoted by 1, the back by 3 and the cast plate by 7. In this modification the back remains stationary. After the plate is cast and has become solid the mold is opened by the core 1 being slid in the direction of the arrow 97; simultaneously with or subsequently to this movement the core is rotated through 180° in the direction of the arrow 98. The plate 7 now abuts against a second semicylindrical member 99, which serves as a carrier for boring. On the core 1 rotating further, the plate 7 is held as before by the fixed stop 101 and is bored out by the boring tool 10 mounted on the core 1.

The motor 13 for driving the milling tool is started and stopped automatically in known manner, so that the apparatus used for this purpose is not shown in the drawings.

In the new machine the valve 102 of the copper for molten metal is opened and closed automatically after the mold has been closed. The valve is controlled by the rod 103 which turns the axle 104 geared with the valve. The rod 103 is driven by the lever 105 which is rocked about its fulcrum 107 by the eccentric 106.

I claim:—

1. In a machine for casting and tooling stereotype plates, the combination of a cylindrical core rotatable about its longitudinal axis and constituting a boring spindle for boring out the inside of a plate cast about the same, and a semicylindrical back movable in a direction at right angles to the axis of the core and adapted to form with the core a mold.

2. In a machine for casting and tooling stereotype plates, the combination of a cylindrical core rotatable about its longitudinal axis and constituting a boring spindle for boring out the inside of a plate cast about the same, and a semicylindrical back movable in a direction at right angles to the axis of the core and adapted to form with the core a mold, with a boring support arranged in such manner that the finished cast plate located on the core passes out of the casting position into the boring support when the core is rotated half a revolution.

3. In a machine for casting and tooling stereotype plates, the combination of a vertical cylindrical core which is rotatable about its longitudinal axis and simultaneously constitutes a boring spindle for boring a plate cast about the same, and a semicylindrical back adapted to form a mold with the core and movable horizontally for opening and closing the mold.

4. In a machine for casting and tooling stereotype plates, the combination of a cylindrical core rotatable about its longitudinal axis and constituting a boring spindle for boring out the inside of a plate cast about the same, and a semicylindrical back movable in a direction at right angles to the axis of the core and adapted to form with the core a mold, with a boring support arranged coaxial with the core in such manner that after a plate has been cast about the core it can be transferred from the mold into the support by turning the core.

5. In a machine for casting and tooling stereotype plates, the combination of a cylindrical core rotatable about its longitudinal axis and constituting a boring spindle for boring out the inside of a plate cast about the same, and a semicylindrical back movable in a direction at right angles to the axis of the core and adapted to form with the core a mold, with a milling tool for cutting off the dead-head from a plate cast in the mold when the plate is being removed from the mold.

6. In a machine for casting and tooling stereotype plates, the combination of a vertical cylindrical core which is rotatable about its longitudinal axis and simultaneously constitutes a boring spindle for boring a plate cast about the same, and a semicylindrical back adapted to form a mold with the core and movable horizontally for opening and closing the mold, with a boring support which is arranged coaxially with the core in such manner that a plate cast in the mold is transferred into the boring support from the mold by the rotation of the core.

7. In a machine for casting and tooling stereotype plates, the combination of a cylindrical core rotatable about its longitudinal axis and constituting a boring spindle for boring out the inside of a plate cast about the same, and a semicylindrical back movable in a direction at right angles to the axis of the core and adapted to form with the core a mold, with a milling tool for cutting off the dead-head from a plate cast in the mold when the plate is being removed from the mold, and a motor for driving said milling tool.

8. In a machine for casting and tooling stereotype plates, the combination of a cylindrical core rotatable about its longitudinal axis and constituting a boring spindle for boring out the inside of a plate cast about the same, and a semicylindrical back movable in a direction at right angles to the axis of the core and adapted to form with the core a mold, with driving means for reciprocating said case, and means for disconnecting the connection between the driving means and the back after the mold has been closed and automatically establishing the connection only after a predetermined time.

9. In a machine for casting and tooling stereotype plates, the combination of a cylindrical core rotatable about its longitudinal axis and constituting a boring spindle for boring out the inside of a plate cast about the same, and a semicylindrical back movable in a direction at right angles to the axis of the core and adapted to form with the core a mold, with driving means, coupling means connecting the latter with the core, and means for disconnecting the coupling means after the mold has been closed and automatically connecting the same again only after a predetermined time.

10. In a machine for casting stereotype plates, the combination of a cylindrical core and a back which is adapted to form a mold with the core and to move horizontally and thereby to open and close the mold, two matrix holders, and a locking device for preventing the movement of the matrix holders in the direction of movement of the core at the commencement of the movement of the back away from the core.

11. In a machine for casting stereotype plates, the combination of a cylindrical core and a back which is adapted to form a mold with the core and to move horizontally and thereby to open and close the mold, two matrix holders, and a locking device for preventing the movement of the matrix holders in the direction of movement of the core at the commencement of the movement of the back away from the core, with a matrix removing device comprising angle brackets firmly connected with the back and holders adapted to hold the edges of the matrix and to slide in a radial direction on said angle brackets when the mold is opened.

12. In a casting machine, the combination of a cylindrical core, a semicylindrical back adapted to form a mold with the core, two matrix holders, and guides rigidly connected with the back and adapted to move the matrix holders approximately radially outward when the mold is being opened.

In testimony whereof, I affix my signature in the presence of two witnesses.

GEORG SEIDEL.

Witnesses:
REINOLD NANNIANN,
A. W. W. COTTLE.

Copies of this patent may be obtained for five cents each, by addressing the "Commissioner of Patents, Washington, D. C."